Aug. 19, 1958 F. H. RICE 2,848,106

CONTAINER FOR PHONOGRAPH RECORD

Filed Dec. 21, 1956 2 Sheets-Sheet 1

INVENTOR

FREDERICK H. RICE

BY

Fulton Bryłowski

ATTORNEY

Aug. 19, 1958 F. H. RICE 2,848,106

CONTAINER FOR PHONOGRAPH RECORD

Filed Dec. 21, 1956 2 Sheets-Sheet 2

INVENTOR
FREDERICK H. RICE

BY

[signature]
ATTORNEY 2,848,106

CONTAINER FOR PHONOGRAPH RECORD

Frederick H. Rice, Van Nuys, Calif.

Application December 21, 1956, Serial No. 629,989
4 Claims. (Cl. 206—62)

Figure 1:
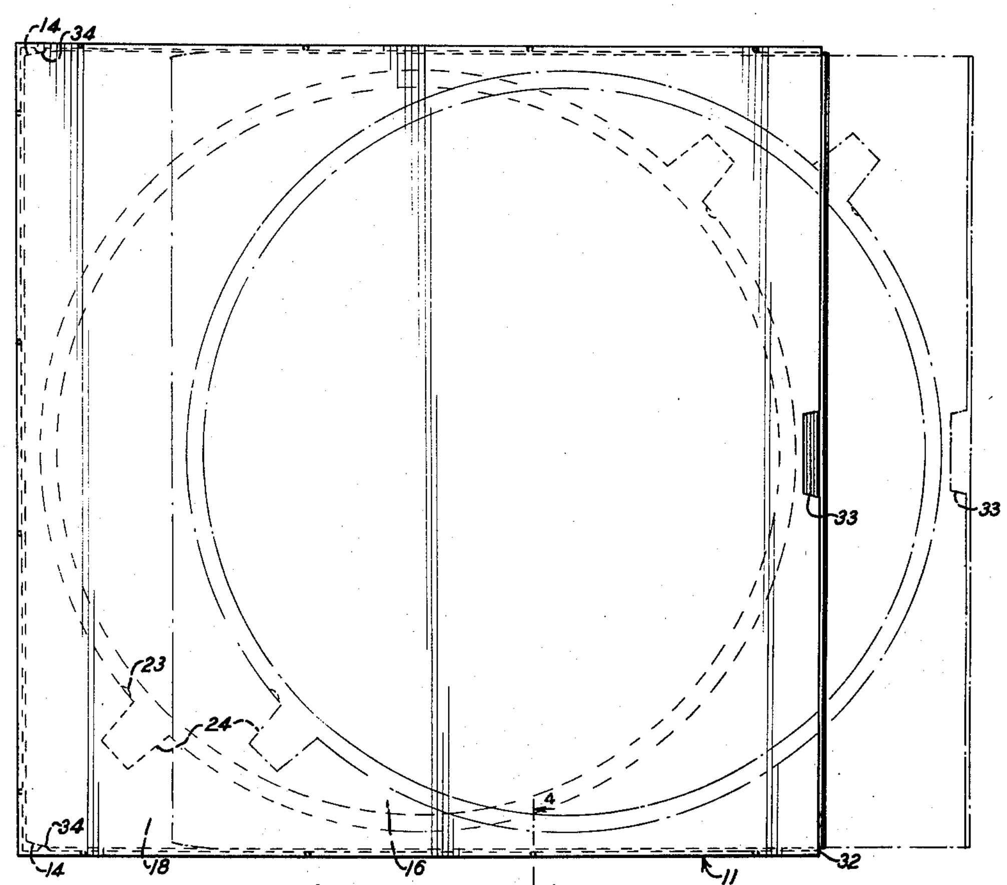

This invention relates to storage display and merchandising and more particularly to a container for receiving and protecting a phonograph record, which container is attractive in appearance thereby promoting sales and at the same time, permits visual inspection of the record contained therein without contact of such record with the hands of the prospective purchaser.

During the past few years, there have been rapid advancements in recording techniques and development of materials utilized in phonograph records, with the result that at the present time, phonograph records are available which may be classified as hi-fidelity records and which when utilized with suitable reproduction equipment, result in a substantially faithful reproduction of the original program material. As is well known, such records, particularly those of the classics, are relatively costly and likewise are subject to damage by contact with objects and, in fact, mere contact of the hands with the grooved portion of a record is extremely undesirable, since the oil or greasy film deposited thereon by the fingers results in a collection of dust or other foreign material which introduces spurious noises during playing of the record.

Heretofore, phonograph records have normally been displayed, stored and sold in albums or folders which are usually provided with relatively stiff covers to provide protection and these albums have commonly contained one or more envelopes for receiving the records comprising such albums. This arrangement obviously, provides no real protection against the accumulation of dust on the surface of the record and even though the same has not been touched by the hands or fingers, thereby depositing an oily film thereon, in many instances, a charge of static electricity present on the surface of the record results in the collection of an accumulation of dust thereon. Furthermore, the majority of record purchasers wish to visually inspect the record for imperfections or damage thereto prior to purchasing of the same and consequently, with the present album method, it has been necessary to remove the records from the album and handle the same during the inspection process. This frequently results in damage to the record and almost invariably results in the deposition of an oily film thereon which, as stated above, promotes the accumulation of and adherence to, of dust to the surface of the record.

Obviously, therefore, any container for storing and displaying of a record which will protect the same against physical damage and at the same time, permit visual inspection thereof, without contact by the fingers or hands of the prospective purchaser, would represent a very real step forward in the art, but in view of the relatively high cost of such records, it would obviously be desirable to provide such a container which would be extremely economical to manufacture and which would not materially increase the selling price of the record or records to be contained therein. Due to the rapid advance in the development of transparent plastic materials and also to the advance in molding techniques, it is now possible to produce a molded transparent plastic container of a size and configuration to receive and retain a phonograph record, which container may be manufactured in mass production at a relatively low cost and consequently may be utilized to contain individual phonograph records without materially adding to the selling price thereof.

It is accordingly an object of the invention to provide a phonograph record container of transparent material which will completely enclose a phonograph record and protect the same against damage or the collection of dust on the surface thereof.

A further object of the invention is the provision of a phonograph record container of transparent material, including means for fixing the record therein against movement and, at the same time, permitting convenient removal of such record from the container.

A still further object of the invention is the provision of a phonograph record container, including means for preventing movement of the record therein and for supporting such record with the grooved portions thereof out of contact with any part of the container.

Another object of the invention is the provision of a phonograph record container of transparent material, which container comprises a record holding section and a cover section, each section being of molded construction.

A further object of the invention is the provision of a phonograph record container of transparent material which may be utilized for storing the record in the home, as well as in the store and in which the record may be conveniently removed therefrom and replaced therein after playing.

A still further object of the invention is the provision of a phonograph record container comprising a record holding section in the form of a tray for receiving the record and a cover section in the form of an envelope to be removably received over the tray to protect the record therein and frictionally held in place on the tray.

Another object of the invention is the provision of a phonograph record container comprising a recording holding section and a cover section and in which means is provided in the form of yieldable material engaging the edges of the record at, at least two spaced points, in order to releasably hold the same in the record holding section.

A further object of the invention is the provision of a phonograph record container of transparent material which may be conveniently and economically manufactured by molding processes thereby providing a container which will not materially add to the cost of a record contained therein.

Figure 2:
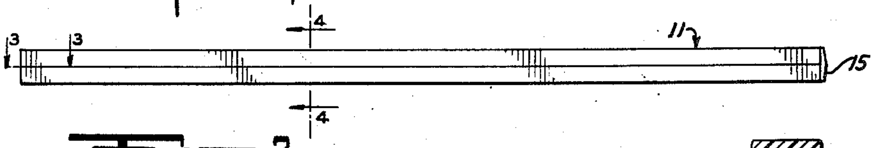
Figure 5:
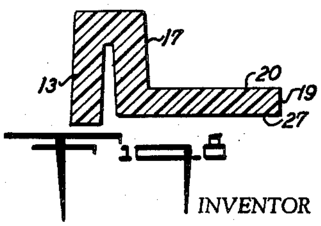
Figure 3:
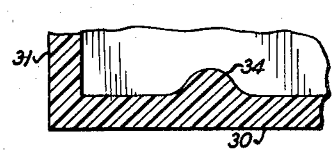
Figure 4:
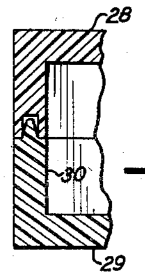
Figures 5, 6, 7, 9, 10, 11:
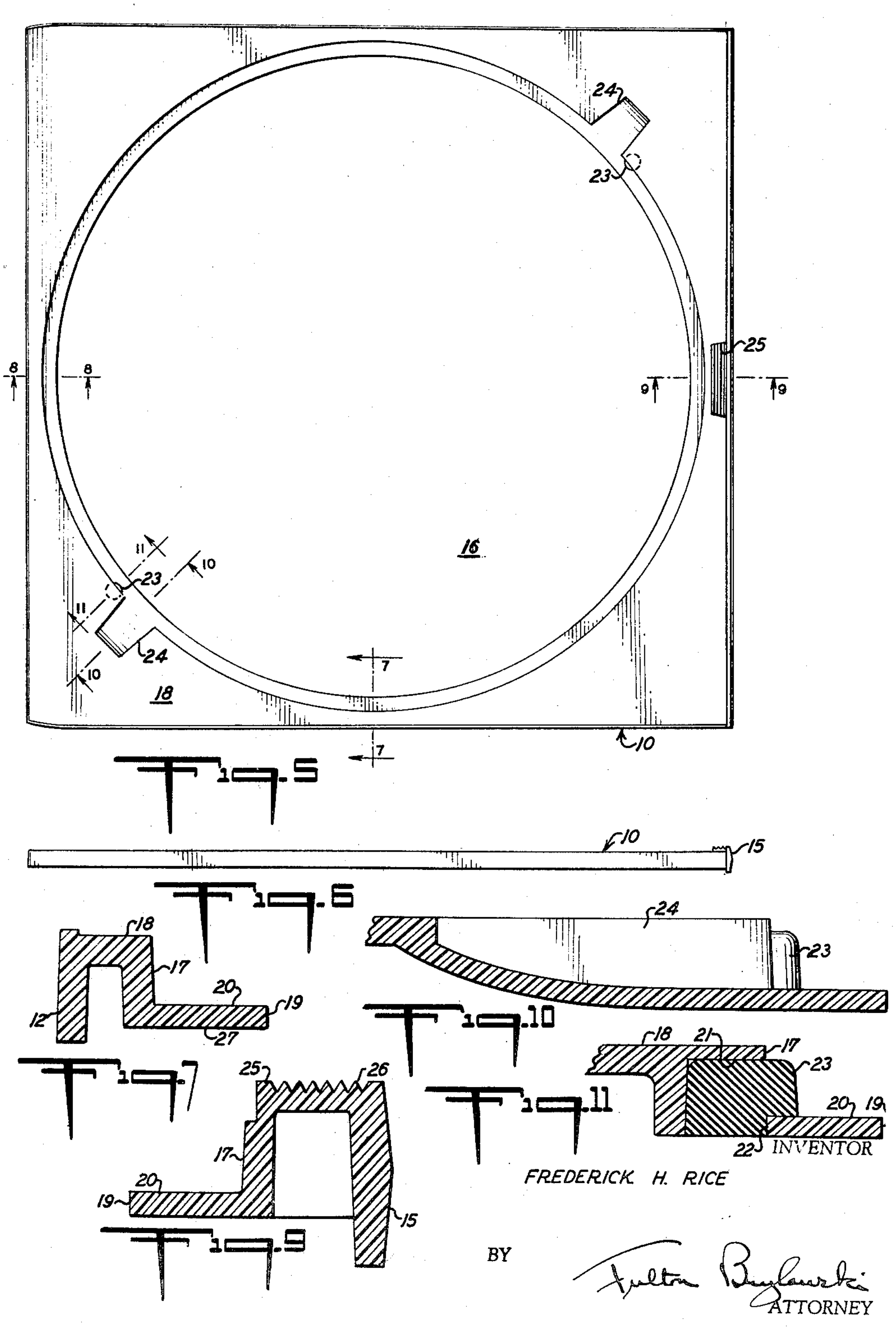

Further objects and advantages of the invention will be apparent from the following description taken in conjunction with the accompanying drawing wherein:

Fig. 1 is top plan view of a phonograph record container constructed in accordance with this invention and showing the same in closed position in full lines and the record holding section partially withdrawn from the cover section in dotted lines;

Fig. 2 a side elevational view of the record container shown in Fig. 1;

Fig. 3 a fragmentary sectional view on the line 3—3 of Fig. 2;

Fig. 4 a fragmentary sectional view on the line 4—4 of Fig. 2;

Fig. 5 a top plan view of the tray forming the record holding section of the record container of this invention;

Fig. 6 a side elevational view of the record holding tray shown in Fig. 5;

Fig. 7 a fragmentary sectional view taken on the line 7—7 of Fig. 5;

Fig. 8 a fragmentary sectional view taken on the line 8—8 of Fig. 5;

Fig. 9 a fragmentary sectional view taken on the line 9—9 of Fig. 5;

Fig. 10 a fragmentary sectional view taken on the line 10—10 of Fig. 5; and

Fig. 11 a fragmentary sectional view taken on the line 11—11 of Fig. 5.

With continued reference to the drawing, there is shown a phonograph record container constructed in accordance with this invention and which may well comprise a record holding section 10 and a cover section 11. The record holding section 10 may well comprise a generally rectangular tray of suitable molded transparent material and any of the well known transparent plastics may be utilized for this purpose. The tray forming the record holding section may be provided with downwardly extending marginal flanges 12 on the side edges and a downwardly extending flange 13 on the rear edge and the rear ends of the side flanges 12 are beveled rearwardly, as shown at 14 in Fig. 1. The front edge of the record holding section 10 is provided with a flange 15 which extends above and below the side flanges 12.

The record holding section 10 is provided with a central aperture 16 extending therethrough and the aperture 16 is defined by a circular flange 17 depending from the top wall 18 of the tray forming the record holding section 10 and the diameter of the aperture 16 defined by the flange 17 is slightly greater than the diameter of a record to be received therein. An annular flange 19 extends inwardly of the aperture 16 from the lower edge of the depending circular flange 17 and the inner diameter of the annular flange 19 is slightly greater than the diameter of the grooved portion of a record to be supported thereon. The distance between the upper surface 20 of the annular flange 19 and the upper surface 18 of the tray forming the record holding section 10 is greater than the thickness of a record to be received in the container. Diametrically disposed recesses 21 are formed in the circular flange 17 and these recesses 21 open inwardly through the flange 17 into the aperture 16 and also the recesses 21 open downwardly through the annular flange 20, by means of an aperture 22 therein. Disposed in the recesses 21 is a mass of yieldable material 23, such as rubber or the like and as clearly shown in Figs. 5 and 11, the inner portion of the mass of yieldable material 23 projects from the recess 21 through the circular flange 17 and into the aperture 16 above the annular flange 19.

Diametrically disposed finger receiving depressions 24 are provided in the top wall 18 of the tray forming the record holding section 10 and, as clearly shown in Figs. 5 and 10, the finger receiving depressions 24 communicate with the aperture 16 through the circular flange 17. An upstanding boss 25 is provided on the tray forming the record holding section 10, the boss 25 being disposed adjacent the front flange 15 substantially midway of the width of the record holding section 10 and the boss 25 is provided with a ribbed finger engaging top surface 26, as clearly shown in Figs. 5 and 9.

A record to be received in the container is disposed in the aperture 16 with the rim outwardly of the grooved portion of the record engaging and supported on the surface 20 of the annular flange 19 and the edges of the record will engage the projecting portions of the yieldable material 23 disposed in the recesses 21 to compress the same and such yieldable material will serve to frictionally retain the record in the aperture 16 and in engagement with the surface 20 of the annular flange 19. When it is desired to remove the record from the container, it is only necessary to insert the finger in the finger receiving depression 24 to engage the edge of the record and move the same radially to compress the opposite mass of yieldable material 23 thereby releasing the adjacent edge of the record from the adjacent mass of yieldable material 23 to permit removal of the same upwardly from the aperture 16. The record may be replaced in substantially the same manner by engaging one edge thereof with the mass of material 23 to compress the same and moving the record downwardly into the aperture 16 and into engagement with the upper surface 20 of the annular flange 19, at which time the edge of the record may be released to engage the other mass of yieldable material 23 to frictionally retain the record therein.

It will be noted, that the record is supported only by the ungrooved rim portion and that the grooved portion is disposed below the upper surface 18 of the record holding section 10 and also above the lower surface 27 of the annular flange 19 which effectively maintains the record out of contact with all surrounding surfaces and objects.

The cover section utilized with the record holding section of this invention comprises an envelope of molded plastic material having a top wall 28, a bottom wall 29, sidewalls 30 and a rear wall 31, the cover section 11 being open at the forward edge 32 to permit insertion and slidably receive the record holding section 10 therein. The top wall 28 of the cover section 11 is provided with a notch 33 in the front edge thereof to receive the upstanding boss 25 on the record holding section 10 when the same is fully received within the cover section 11. The provision of the notch 33 permits the ribbed upper surface 26 of the boss 25 to be exposed for convenient engagement by the fingers of the user to permit withdrawal of the record holding section 10 from the cover section 11.

The cover section 11 is frictionally retained on the record holding section 10 by inwardly extending integral projections 34 provided on the sidewalls 30 and engaging the beveled ends 14 on the side flanges 12 of the record holding section 10.

If desired, the cover section 11 may be made in two parts as shown in Fig. 4, and joined in any suitable manner along a median line to form a one-piece envelope which will serve to provide a dust-proof cover for the tray forming the record holding section 10.

It will thus be seen, that by the above described invention there has been provided a relatively simple phonograph record container which may be conveniently and economically manufactured by any suitable molding process, from any suitable transparent plastic material and which will provide adequate protection for a record received therein to prevent an accumulation of dust or other foreign material thereon and also to prevent contact of the same with objects or surfaces thereby materially reducing the likelihood of damage to the grooved portion of the record. The cover section may be conveniently removed by relatively simple manipulation thereof in order to expose the record for removal or to permit replacement of the same in the record holding section and the record will be firmly retained therein until such time as the same may be removed for inspection or playing.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A phonograph record container of transparent material and comprising a record holding section and a cover section slidably received on said holding section, said holding section comprising a rectangular tray of plastic material, downwardly extending marginal flanges on the side and rear edges of said tray, the rear ends of said side flanges being beveled inwardly, a flange on the front edge of said tray extending above and below said side flanges, said tray having an aperture defined by a circular flange on said tray and having a diameter slightly greater than the diameter of a record to be received therein, an annular flange extending inwardly of said aperture from said circular flange and having an inner diameter slightly greater than the diameter of the grooved portion of a record to be supported thereon, the distance between the upper surface of said annular flange and the upper surface of said tray being greater than the thickness of said record, diametrically opposed recesses in said circular flange, a mass of yieldable material disposed in each recess and projecting inwardly of said circular flange to engage the edge of a record and releasably hold the same in engagement with said annular flange, finger receiving depressions in the upper surface of said tray adjacent each recess and opening inwardly through said circular flange to facilitate removal of a record and an upstanding boss on the upper surface of said tray adjacent said front edge midway of the width of said tray and having a finger engaging top surface, said cover section comprising a transparent envelope of plastic material having top, bottom, side and rear walls and open along the front and slidably receiving said record holding section, a notch in the front edge of said top wall receiving said boss and inwardly extending integral projections on said sidewalls engaging the beveled ends of said side flanges to frictionally retain said cover section on said record holding section.

2. A phonograph record container of transparent material and comprising a record holding section and a cover section slidably received on said holding section, said holding section comprising a generally rectangular tray of plastic material, downwardly extending marginal flanges on the side and rear edges of said tray, the rear ends of said side flanges being beveled inwardly, a flange on the front edge of said tray extending above and below said side flanges, said tray having an aperture defined by a circular flange on said tray and having a diameter slightly greater than the diameter of a record to be received therein, an annular flange extending inwardly of said aperture from said circular flange and having an inner diameter slightly greater than the diameter of the grooved portion of a record to be supported thereon, the distance between the upper surface of said annular flange and the upper surface of said tray being greater than the thickness of said record, diametrically opposed recesses in said circular flange, a mass of yieldable material disposed in each recess and projecting inwardly of said circular flange to engage the edge of a record and releasably hold the same in engagement with said annular flange and an upstanding boss on the upper surface of said tray adjacent said front edge midway of the width of said tray and having a finger engaging top surface, said cover section comprising a transparent envelope of plastic material having top, bottom, side and rear walls and open along the front and slidably receiving said record holding section, a notch in the front edge of said top wall receiving said boss and inwardly extending integral projections on said sidewalls engaging the beveled ends of said side flanges to frictionally retain said cover section on said record holding section.

3. A phonograph record container of transparent material and comprising a record holding section and a cover section slidably received on said holding section, said holding section comprising a generally rectangular tray of plastic material, downwardly extending marginal flanges on the side and rear edges of said tray, the rear ends of said side flanges being beveled inwardly, a flange on the front edge of said tray extending above and below said side flanges, said tray having an aperture defined by a circular flange on said tray and having a diameter slightly greater than the diameter of a record to be received therein, an annular flange extending inwardly of said aperture from said circular flange and having an inner diameter slightly greater than the diameter of the grooved portion of a record to be supported thereon, the distance between the upper surface of said annular flange and the upper surface of said tray being greater than the thickness of said record, diametrically opposed recesses in said circular flange and a mass of yieldable material disposed in each recess and projecting inwardly of said circular flange to engage the edge of a record and releasably hold the same in engagement with said annular flange, said cover section comprising a transparent envelope of plastic material having top, bottom, side and rear walls and open along the front and slidably receiving said record holding section and inwardly extending integral projections on said sidewalls engaging the beveled ends of said side flanges to frictionally retain said cover section on said record holding section.

4. A phonograph record container of transparent material and comprising a record holding section and a cover section slidably received on said holding section, said holding section comprising a generally rectangular tray of plastic material, downwardly extending marginal flanges on the side and rear edges of said tray, a flange on the front edge of said tray, said tray having an aperture defined by a circular flange on said tray and having a diameter slightly greater than the diameter of a record to be received therein, an annular flange extending inwardly of said aperture from said circular flange and having an inner diameter slightly greater than the diameter of the grooved portion of a record to be supported thereon, the distance between the upper surface of said annular flange and the upper surface of said tray being greater than the thickness of said record, diametrically opposed recesses in said circular flange and a mass of yieldable material disposed in each recess and projecting inwardly of said circular flange to engage the edge of a record and releasably hold the same in engagement with said annular flange, said cover section comprising a transparent envelope of plastic material having top, bottom, side and rear walls and open along the front and slidably receiving said record holding section and means to frictionally retain said cover section on said record holding section.

References Cited in the file of this patent

UNITED STATES PATENTS

| | | |
|---|---|---|
| 2,617,699 | Sullivan | Nov. 11, 1952 |

FOREIGN PATENTS

| | | |
|---|---|---|
| 21,009 | Great Britain | of 1907 |